United States Patent [19]
Leonian

[11] Patent Number: 5,139,220
[45] Date of Patent: Aug. 18, 1992

[54] SUPPORT STAND WITH SLING BOOM SUSPENSION

[76] Inventor: Phillip M. Leonian, 80 Central Park W., Apt. 25B, New York, N.Y. 10023

[21] Appl. No.: 608,253

[22] Filed: Nov. 2, 1990

[51] Int. Cl.$^5$ .............................................. F16L 3/00
[52] U.S. Cl. .................................... 248/122; 248/124; 248/413; 403/362
[58] Field of Search ............ 248/171, 121, 122, 123.1, 248/124, 158, 413, 411, 412, 331, 354.4, 145, 125; 403/109, 362; 362/401, 402, 427; 381/169

[56] References Cited

U.S. PATENT DOCUMENTS

| | | | |
|---|---|---|---|
| 774,852 | 11/1904 | Shaw | 362/401 |
| 1,725,693 | 8/1929 | Arledge | 248/123.1 |
| 1,887,637 | 11/1932 | Hansen | 248/123.1 |
| 1,942,925 | 1/1934 | Jenkins | 248/123.1 |
| 2,479,720 | 8/1949 | Brandt | 248/123.1 |
| 2,777,944 | 1/1957 | Koch | 362/401 |
| 3,730,569 | 5/1973 | Feinler | 403/362 |

FOREIGN PATENT DOCUMENTS

| | | | |
|---|---|---|---|
| 584116 | 12/1977 | U.S.S.R. | 403/362 |
| 631786 | 11/1949 | United Kingdom | 403/362 |

*Primary Examiner*—J. Franklin Foss
*Attorney, Agent, or Firm*—Tilton, Fallon Lungmus

[57] ABSTRACT

A lightweight support stand particularly suitable for photographic equipment and the like in which a boom is suspended solely by a suspension cable that has its intermediate portion adjustably carried by a retainer at the top of a vertical standard. Opposite ends of the cable are adjustably connected to end portions of the boom. The boom is formed of a plurality of small-diameter sections that may be readily disassembled for transit and storage, and the standard includes a plurality of tubular sections that may be telescoped together. Collars for adjustably holding the sections of the standard in extended condition and for adjustably connecting the ends of the cable to the boom, a simple and highly-effective method for making such collars, and a retainer for adjustably supporting the cable at the upper end of the standard, are also disclosed.

29 Claims, 3 Drawing Sheets

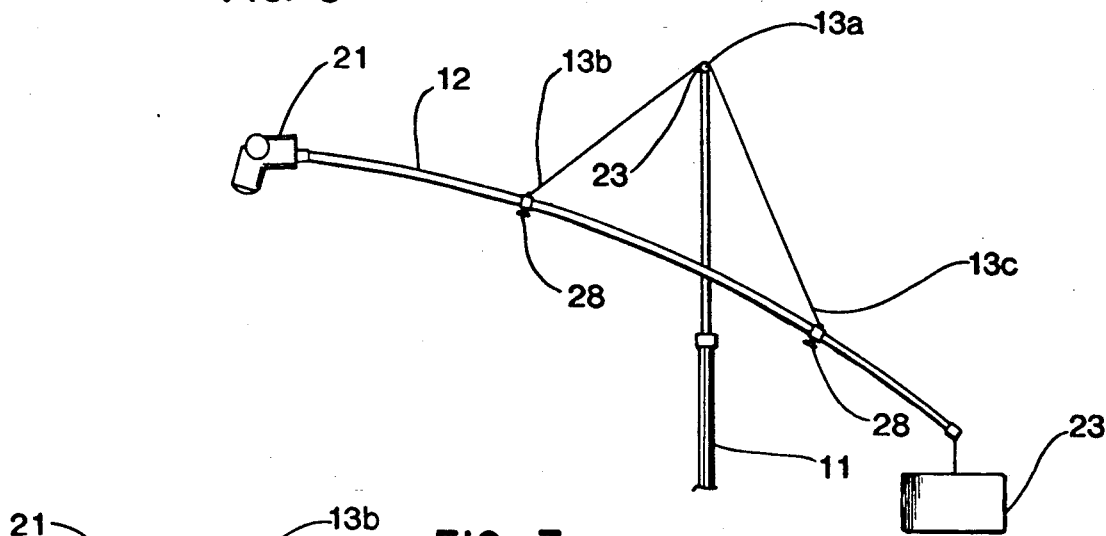
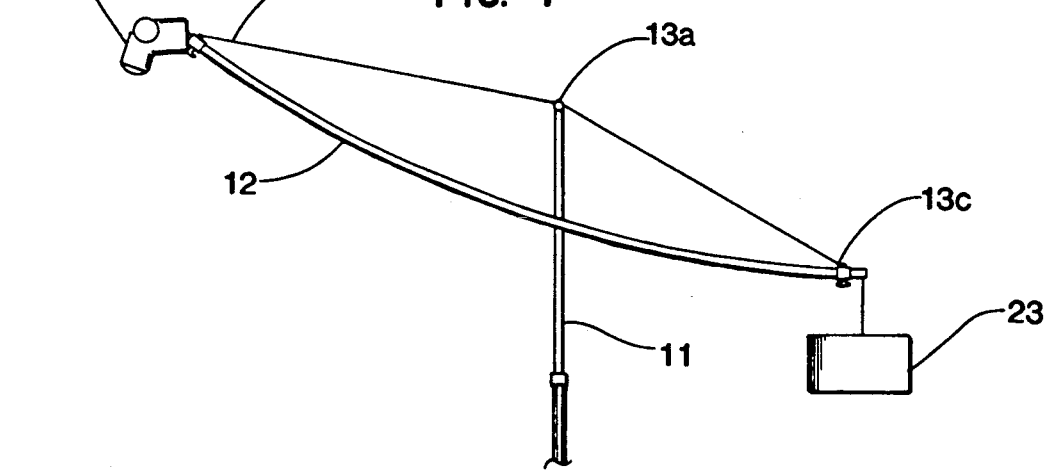
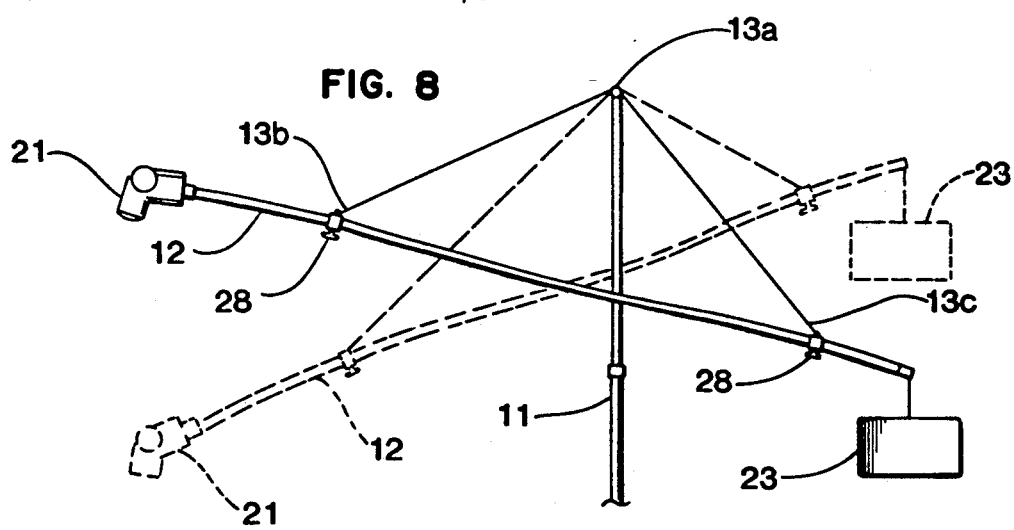

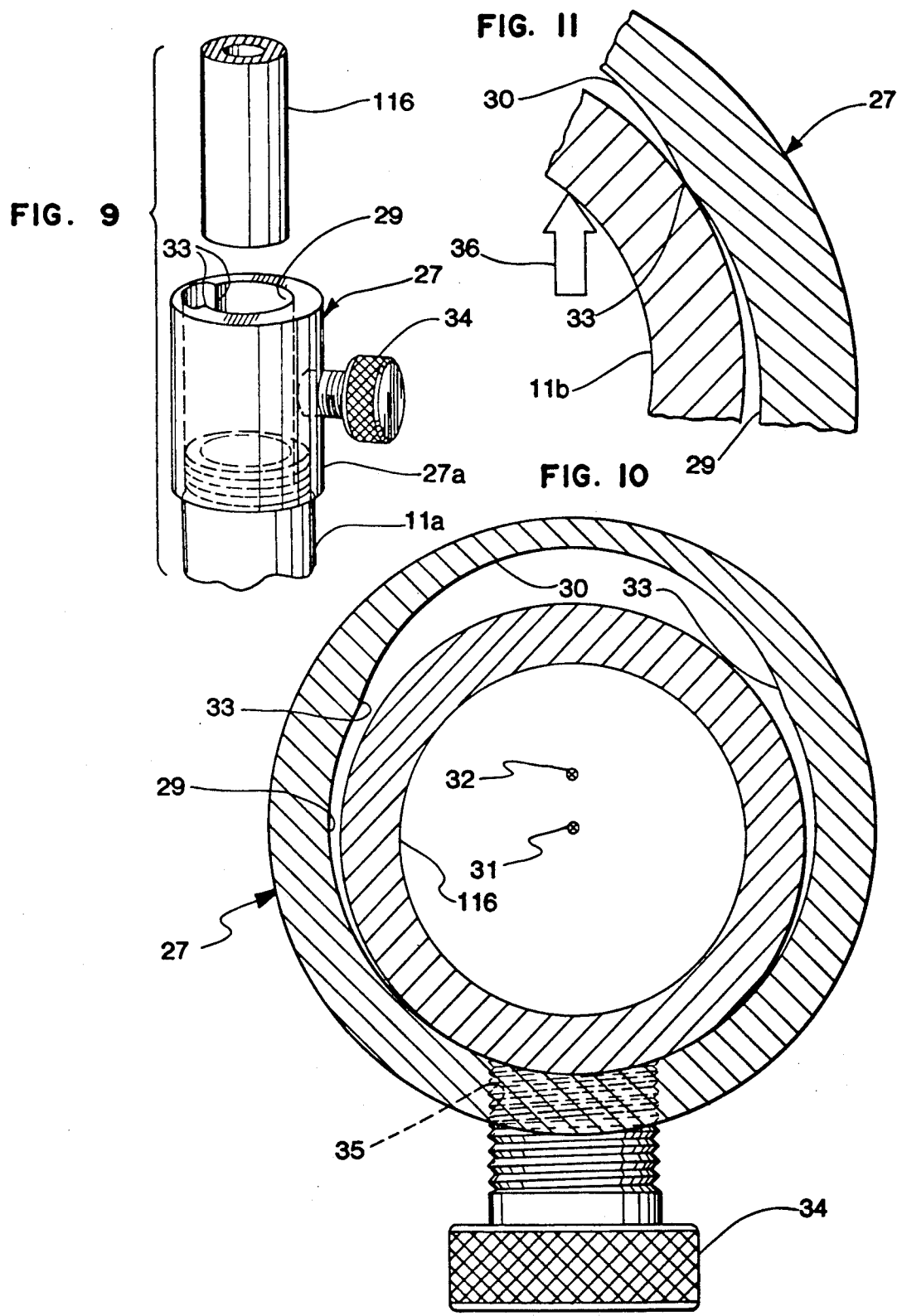

SUPPORT STAND WITH SLING BOOM SUSPENSION

BACKGROUND AND SUMMARY

Lights used by photographers in their studios are typically designed for high light output without regard for their bulk and weight. The associated supported equipment is sized to match. Since such support equipment is not readily portable, it is transported to and from the studio only at considerable effort and expense when a photographer is called on to set up complex lighting on location.

Non-studio freelance photographers do most of their work utilizing natural or available light. Their limited physical resources restrict them to minimal and simple lighting—often lightweight battery-powered stroboscopic (strobe) lights.

Boom lighting equipment is an item of support equipment hat is rarely available to either type of photographer by virtue of its massive structure and weight. Historically, common wisdom has dictated that photographic boomstands be structured in the style of a derrick with its boom supported in cantilever fashion, necessitating rigid, bulky, and heavy members even though modern strobes are readily available which separate the relatively lightweight light/reflector assembly from the heavy power pack.

An important aspect of this invention therefore lies in the recognition that support apparatus, particularly of the type used in connection with lighting equipment for photographic purposes, need not be rigid and that a flexible boom and/or a standard, if properly constructed and balanced, may be highly effective for such purposes. With flexibility being a permissible specification, the cross sectional dimensions and wall thickness of the parts may be greatly reduced and, with other requirements met, the result is a compact, lightweight assembly that is highly portable and may be easily assembled and adjusted by a photographer without help from others.

A further aspect of this invention lies in the recognition that these objectives may be in part achieved by providing a stand that utilizes a sling suspension for the equipment-supporting boom. The boom is a "floating" one in a sense that is not directly connected to the vertical support standard. Instead, it is carried by a suspension cable that has its intermediate portion adjustably secured to a retainer at the top of the standard and has its ends adjustably connected to opposite end portions of the boom. Positioning of the cable with respect to the retainer and to its points of connection with the boom are fully adjustable to achieve a balanced condition under various loadings and angular orientations of the boom. Although the lightweight boom has considerable flexibility, proper adjustment of the suspension cable causes the boom to assume a rectilinear condition with the result that load forces are applied to the boom and standard as axial compressive forces rather than flexing or distorting forces.

The invention also includes the provision of dependable, highly-effective means for adjustably securing the suspension cable to both the boom and the standard and for reliably holding the telescoping sections of the standard in whatever degree of extension is selected. Such means takes the form of collars having bores that are relieved by arcuate recesses which define pairs of circumferentially-spaced contact edges along the longitudinal lines of merger between the surfaces of the recesses and the cylindrical (or partially-cylindrical) surfaces of the bores. A thumbscrew or set screw is provided by each collar, such screw facing generally in the direction of such contact edges and extending along a plane equidistant therebetween. Tightening of the thumbscrew against a cylindrical member extending through the collar forces that member into tight, non-slipping engagement with the spaced contact edges. Despite the high unit gripping force achieved by such an arrangement, the thumbscrews may be easily turned to permit disengagement or readjustment of the parts whenever desired.

The retainer at the top of the vertical standard preferably takes the form of a transverse member having at least one arcuate, upwardly-facing groove defined by a pair of spaced bearing surfaces. Ideally, the member is generally cylindrical and the groove extends circumferentially with its axis perpendicular to that of the standard. The groove tapers inwardly from a width greater than that of the cable to a width less than the cable's diameter. The weight of the boom and its load securely holds the cable in a selected position of adjustment within the groove; however, release of the cable from the retainer may be easily achieved simply by lifting it from the groove.

Other features, objects, and advantages of the invention will become apparent from the specification and drawings.

DRAWINGS

FIGS. 6–8 are schematic views illustrating the flexing action of the boom, and its preferred rectilinear condition, upon adjustment of the suspension system.

FIG. 9 is an exploded perspective view illustrating adjacent segments or sections of the telescoping standard and, in particular, the locking collar therefor.

FIG. 10 is a greatly enlarged cross sectional view, somewhat exaggerated for purposes of illustration, showing the relationship between a collar and a tubular member received therein.

FIG. 11 is a further enlarged fragmentary sectional view showing the relationship of parts upon tightening.

DETAILED DESCRIPTION OF PREFERRED EMBODIMENT

Figure 1:
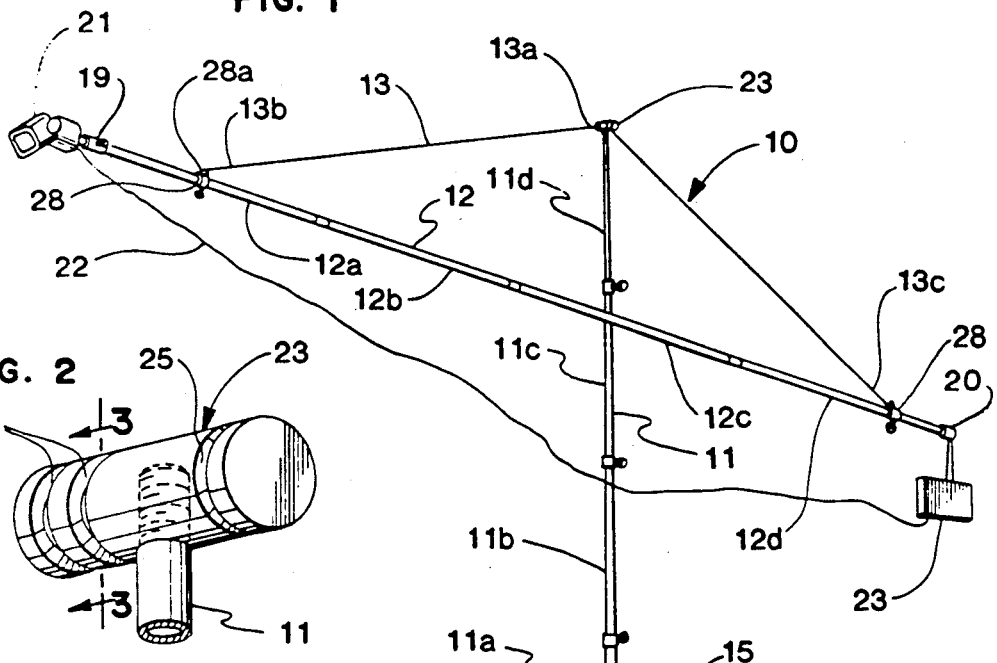
FIG. 1 is a perspective view of a support stand with sling boom suspension embodying the present invention, the stand being shown supporting a lightweight strobe light and battery pack.

Referring to FIG. 1, the numeral 10 generally designates an equipment-supporting apparatus comprising a standard 11, a floating boom 12, and a suspension cable 13. The standard is composed of a plurality of telescoping tubular members or section 11a, 11b, 11c, and 11d. The lowermost section 11a is equipped with three hinged arms or struts 14 with links 142 extending from the struts to an adjustment collar 15. The struts may therefore be collapsed against the side of the lower section 11a by upward sliding movement of collar 15 and, conversely, extended into the operative position depicted in FIG. 1 by downward sliding movement of the collar. The collar and its locking means will be described in greater detail hereinafter, but it is to be understood that the particular strut and link assembly depicted in FIG. 1 is not critical and that other collapsible structures, as commonly found on conventional photographic lightstands, for supporting the standard in vertical condition on a support surface may be provided Also, the lower end of section 11a is preferably provided with a downwardly-facing threaded socket 11e for receiving the upstanding threaded stem or screw of a standard tripod so that, if desired, the standard may be connected to such a tripod to provide additional vertical extension of the standard and thereby increase the elevation of boom 12 and the equipment carried by it. The use of a tripod is particularly advantageous where the ground, floor, or other support surface is not level since, in such a case, the tripod may nevertheless be adjusted to insure that standard 11 is vertical.

Standard sections 11a–11d may be of uniform length or, preferably, of slightly decreasing length from bottom to top. For a stand intended for photographic purposes, such sections would not be expected to exceed about 30 inches. Each section has cylindrical outer and inner surfaces with the inner surface of one having a diameter only slightly greater than the outside diameter of the adjacent section receivable therein. While four sections are depicted in the drawings, it is to be understood that a greater or smaller number may be provided and that the range in diameters from the largest to smallest will depend in great part on the number of sections provided. For portability as a stand for supporting photographic equipment, however, it is advantageous if the outside diameter of the largest section 11a does not exceed about one inch Boom 12 is similarly formed of sections 12a, 12b, 12c, and 12d. Such sections are cylindrical and elongated. While they may be tubular, they are shown to be solid in the photographic equipment stand illustrated in the drawings. In a stand intended for such purposes, it has been found effective to provide boom sections having outside diameters within the general range of 0.375 to 0.625 inches.

Figure 5:
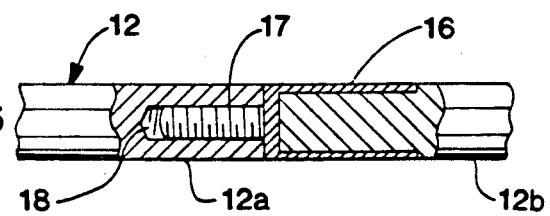
FIG. 5 is a fragmentary elevational view, shown partly in section, depicting the connection between adjacent segments of the boom.

Any suitable means may be provided for securely but detachably connecting the boom sections together. In the embodiment shown, each section or segment is provided at one end with a ferrule 16 equipped with a threaded stem 17. At its opposite end, each section has a threaded socket 18 for receiving the stem of an adjacent section (FIG. 5). A plurality of such sections may therefore be easily connected or disconnected to provide a boom 12 of the desired length. For photographic equipment usage, boom sections of up to 30 inches have been found suitable. While a boom composed of four such sections is illustrated, a greater or smaller number may be provided.

Suitable adapters 19 and 20 are connected to opposite ends of the boom, preferably utilizing the threaded stems 17 and sockets 18 for the purpose of supporting equipment such as a strobe light 21, and battery power pack 23. Depending on the intended usage of the stand, other items of equipment may be loaded upon the ends of the boom. Equal loading is not essential; in fact, it has been found desirable at least in some instances to utilize a power pack 23 of approximately twice the weight of light 21 so that the distance of the light from standard 11 may be two or more times that of the distance between the power pack and the standard.

Figure 2:
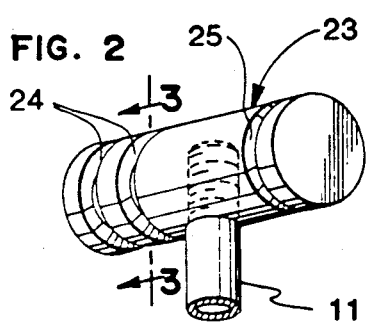
FIG. 2 is a fragmentary perspective view illustrating the cable retaining means at the upper end of the standard
Figure 4:
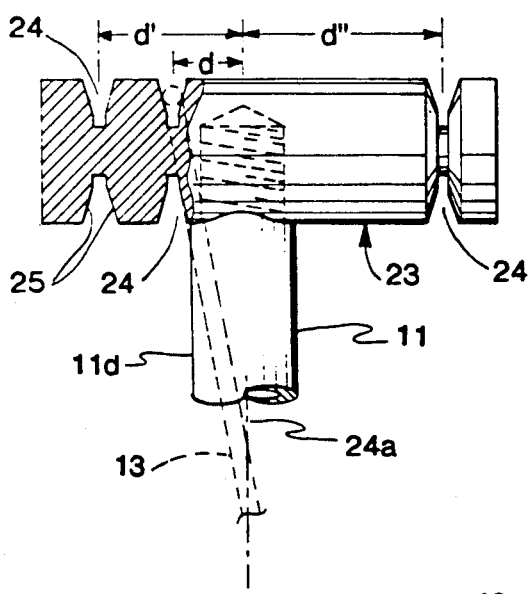
FIG. 4 is an enlarged sectional view taken along line 4—4 of FIG. 3.
Figure 3:
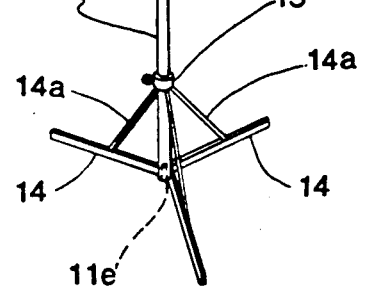
FIG. 3 is an enlarged sectional view taken along line 3—3 of FIG. 2.

The boom is a "floating" one to the extent that there is no direct connection between that boom and standard 11. Instead, the boom is suspended in sling fashion by means of suspension cable 13. The intermediate portion 13a of that cable extends over a retainer 23 secured to the upper end of standard 11. As shown most clearly in FIGS. 2–4, the retainer is cylindrical in shape and is disposed with its axis extending horizontally—that is, perpendicular to the upstanding standard 11. At least one vertical groove 24 is formed in the retainer, such groove being defined by sloping surfaces 25 which have their peripheral or outer limits spaced apart a distance greater than the diameter of cable 13 but which slope inwardly with their inner limits spaced closer than the diameter of the cable. To provide sufficient gripping force for the loads normally encountered in photographic usage, and still permit the cable to be easily lifted from the groove when adjustment or disassembly is desired, it is believed that the included angle between the sloping surfaces defining the groove should fall within the general range of about 30 to 90 degrees.

Groove 24 extends circumferentially about the cylindrical retainer member 23. The angular dimension of the segment of the groove engaged by the intermediate portion 13a of the cable depends in part on the portions of the boom 12 to which the ends of the cable are connected since that in turn controls the angular change in direction of the cable as it passes over and through the retainer.

In the embodiment shown in the drawings, retainer 23 is provided with a plurality of grooves 24 offset from the vertical axis 24a of the standard at different distances d, d', and d", each of which exceeds the radius of the standard's upper section 11d. The purpose of such offset is to nullify or compensate for the bending forces that would otherwise be exerted on the standard by the boom and its load by reason of the fact that the boom is positioned to one side of the standard. The point at which the boom engages the standard is diametrically opposite from the particular groove 24 selected for retaining cable 13, with the result that the cable extends along a plane that is angled slightly from the vertical and crosses the axis of the standard in a region generally equidistant between the retainer 23 and the boom 12. Because of the diametric opposition of the selected groove and the boom with respect to the vertical axis of the standard, forces that would otherwise cause the standard to bend, with its upper end flexing in a direction toward that side of the standard against which the boom rests, are counterbalanced or equalized. Such conversion of bending forces into axial compressive forces helps to maintain the standard in straight or vertical condition when the stand is in use despite the fact that the standard is inherently flexible because of its small diameter and substantial length (height).

While such results might be achieved by a retainer 23 having only a single groove 24, the retainer ideally is provided with a plurality of grooves spaced laterally from the axis of the standard at different distances Such an arrangement is particularly advantageous where booms of different diameters might be used or where the stand is intended to support other types of loads, such as a horizontal roll of background paper, as disclosed in copending application Ser. No. 608,254. filed Nov. 2, 1990. The user then selects whichever groove 24 is most effective in offsetting the bending forces that would otherwise be exerted by the load upon the standard. In general, the groove used to support the cable should be spaced laterally from the axis 24a of the standard 11 a distance that is approximately equal to the combined outside radius of the boom 12 and the outside radius of the intermediate section of the standard (section 11c in the illustration given) engaged by the boom.

Cable 13 is preferably formed of stranded steel wire coated with a smooth outer layer of nylon or other suitable polymeric material; however, other materials having similar properties of strength, durability, flexibility, and limited compressibility ma be used. Slight compressibility of the outer layer is believed useful because limited deformation of that layer when the cable 13 is wedged into a groove 24 of retainer 23 contributes in securing the cable against unintended sliding action. The segments of the boom 12, and those of standard 11 are preferably formed primarily of aluminum because of its high strength-weight ratio; however, other metals having similar properties may be substituted. Ferrules 16 and the set screws for the connecting collars hereinafter described are advantageously machined from brass in the embodiment disclosed. When so constructed, a 14-foot stand (with a 10-foot boom), intended for photographic use and embodying the features described herein, including the standard 11, boom 12, and fittings 23, 27, may weigh as little as three pounds, in sharp contrast to the conventional, rigid, derrick-style stands for studio use that may weigh 30 pounds or more.

Although aluminum and other metals from which the standard and boom may be formed are regarded as rigid, the high length-diameter aspect ratio of these components endows them with a significant degree of flexibility as already indicated. The extent and direction of boom flexure depend partly on the end loading of the boom and partly on the location of the points of connection between the ends 13b and 13c of cable 13 and the boom 12. Once the loads to be supported by the boom have been selected and attached, the points of connection between the ends of the cable and the boom are adjusted until the boom assumes a generally straight or rectilinear condition. Such a process is schematically depicted in FIGS. 6–8.

In FIG. 6, the ends of the cable are spaced too far from the loads 21 and 23 with the result that the boom becomes arched, that is, develops an upwardly-directed convex curvature. On the other hand, shifting the points of connection outwardly to the ends of the boom may cause a negative bowing with downwardly-facing convex curvature (FIG. 7). In either case, a portion of the loading is borne by the boom's resistance to excessive flexure. Ideally, the points of connection are adjusted by the user until the boom assumes a substantially rectilinear condition. It will be observed from FIG. 8 that even when the points of connection are properly adjusted the boom is not precisely straight but instead, because of its flexibility, assumes a slight double "s" shape suggestive of the shape of a compound bow. Under such conditions, the flex forces applied to the boom (i.e., the end loads plus the weight of the boom both inboard and outboard of the sling connections) are generally divided into thirds with the dividing points being the points of connection between the cable 13 and the boom 12. Once such points of connection have been selected for achieving linearity of the boom, it has been found that such points remain constant regardless of the direction and extent of inclination of the boom. Such inclination is altered by shifting the intermediate portion 13a of the cable along the groove of retainer 23 until the loads 21 and 23 are at the desired elevations. Because the entire assembly is extremely light in weight (the weight of such an assembly designed for photographic purposes, combined with a standard light head and counterweight, preferably weighs under 8 pounds), such adjustments may be easily made by a single operator.

In FIG. 1, an electric cord 22 extends between battery pack 23, which serves as a counterweight, and light 21 and, for clarity of illustration, is shown hanging free of boom 12. It has been found convenient in actual practice to connect the cord at several points to the cable by conventional twist ties, clips, or any other suitable connecting means.

FIG. 9 and 10 depict the collars 27 advantageously used to adjustably secure the telescoping sections of standard 11 in the desired condition of extension. Also, substantially the same collar construction is utilized for collar 15 for the retractable strut assembly at the base of the standard and for collars 28 that join the ends of cable 13 to the end portions of boom 12. While such collars differ somewhat in size and in the manner in which they are mounted or connected to other parts, they all have a critical feature in common. While that feature is shown in FIGS. 9 and 10 in connection with the collars 27 for standard 11, it is to be understood that the same feature is also provided by collars 15 and 28.

Collar 27 is internally threaded at its lower end 27a to receive the threaded upper end of one of the sections 11a-11c of the standard. The bore 29 of the collar is generally cylindrical, having what may be termed a base diameter slightly larger than the outside diameter of the smaller cylindrical section (e.g., 11b) telescopingly receivable therein.

Referring to FIG. 10, it will be observed that the cylindrical bore 29 of the collar is relieved by an arcuate recess 30. The recess has a surface defining a portion of a cylinder substantially smaller than the cylinder defined by bore 29. Thus, if the bore 29 were formed by a drill rotating about axis 31 of the collar, recess 30 would be formed by a rotary tool of smaller diameter rotating about eccentric axis 32. In general, it has been found that the extent of eccentricity between axes 31 and 32 should approximate the size differential between the two cutting tools and that the rotary boring bar or other cutting tool for forming recess 30 should be selected so that a pair of apical and longitudinally extending contact edges or ridges 33 are formed along the inner surface of the collar and are spaced apart an angular distance within the range of about 90 degrees to 150 degrees, preferably about 120 degrees, relative to the outer surface of tubular section or member 11b.

A thumbscrew 34 is threadedly received in an opening 35 located at a intermediate point along the length of the collar and extending along a plane parallel with edges 33 and equidistant between them. As a result, when screw 34 is tightened, cylindrical member 11b is urged by the screw into forceful line contact with longitudinally-extending edges 33 (FIG. 11). Because of the substantial force per unit area, the generally equal angular spacing between lines of contact 33 and the contact point of screw 34 about the surface of inner member 11b, and the position of the screw at about the longitudinal mid-point of the collar, tightening of the screw securely locks the collar to the tubular member received in bore 29. Also, such an arrangement, by which the tubular member received in bore 29 is urged tightly against parallel edges 33, helps insure that the telescoping sections of the standard 11 will be secured together in longitudinal alignment. It is believed apparent that the straightness of the standard is an important factor in centering the load at the top of the stand when the assembly is in use.

Forming the arcuate recess by a rotary boring or milling operation, using a cutting tool smaller than the diameter of the primary bore of a collar and displacing the axis of the cutting tool from that of the bore by a distance approximating the difference in diameter of the primary bore and that of the cutting tool, (which in turn should be approximately double the difference between the diameter of the primary bore and the outside diameter of the cylindrical member to be received therein) has been found to be a relatively simple and particularly effective method for forming the longitudinally-extending contact edges or ridges 33 and for establishing the angular distance between those edges of approximately 120 degrees. Referring to FIG. 11, where the amount of material removed from the wall of collar 27 to form recess 30 has been somewhat exaggerated for clarity of illustration, it will be observed that arcuate surfaces that merge along line 33 result in substantial material bulk on opposite sides of the contact edge. Edge 33 is in the form of a highly obtuse angle, substantially greater than 150 degrees, defined by the merger of two cylindrical surfaces generated along closely-spaced parallel axes. Substantial force produced in the direction of arrow 36 by the tightening of screw 34 is unlikely to deform the edges or ridges because of such obtuseness and the buttressing effect provided by the substantial bulk of wall material on opposite sides of those edges, although slight nonpermanent distortion or deformation in the cross-sectional configuration of the member received in the bore of the collar, especially where that member is tubular rather than solid, may occur upon tightening of the screw. Such distortion of the inner member contributes further in preventing relative rotation of the inner member and collar when the thumbscrew is tightened. In practice, it has been found that the three-point (or one-point, two-line) contact is so highly effective in securing the parts against relative rotational axial, and rocking movement that extreme tightening of screw 34 is unnecessary. That being the case, the head of the thumbscrew may be made relatively small (as shown) to prevent overtorquing and overtightening by a user.

As indicated, the amount of material removed from the inside wall of collar 27 in forming recess 30 may be minimal. For example, assuming that a tubular section of standard 11 has an outside diameter of 0.5 inches, it has been found effective to form a collar having a primary bore with a diameter 0.005 inches oversize (i.e., 0.505 inches), and then, using a rotary cutter with a diameter that is 0.005 inches undersize (i.e., 0.495 inches), and rotating it about an axis that is 0.010 inches off center, to cut away material from one side of the interior of the collar to form recess 30.

The construction of collars 28 is substantially identical to that of collar 27 except that the internal threading is eliminated and connecting means, which may take the form of loops 28a, are provided to offer a secure connection between the collars 28 and cable 13. Similarly, collar 15 is similar to collar 27 except that the threading is omitted and collar 15 is pivotally connected to the links 14 for struts 13. In each case, the collars are provided with bores relieved by recesses 30 which define spaced contact edges 33 opposite from set screws 34 for securely anchoring the collars to the tubular members received therein when the set screws are tightened.

While in the foregoing I have disclosed an embodiment of the invention in considerable detail for purposes of illustration, it will be understood by those skilled in the art that many of these details may be varied without departing from the spirit and scope of the invention.

I claim:

1. A support stand comprising a vertical standard having upper and lower ends; means at said lower end for stabilizing said standard on a support surface; a transversely-extending boom having opposite end portions provided with connecting means for attachment to articles to be supported by said boom and having an intermediate portion resting against said standard along one side thereof at a point below the standard's upper end; said intermediate portion being freely movable relative to said standard; cable retaining means at said upper end of said standard; and suspension cable having ends adjustably connected to said end portions of said boom for adjustment into selected longitudinal positions along said boom end portions and an intermediate portion extending over and adjustably retained by said retaining means.

2. The stand of claim 1 in which said standard includes a plurality of tubular telescoping sections of about equal length.

3. The stand of claim 2 in which said tubular standard sections are cylindrical.

4. The stand of claim 3 in which connecting means are provided at the upper ends of at least some of said standard sections for adjustably locking each such standard section to a standard section of smaller diameter received therein; each connecting means comprising a collar having a cylindrical bore slightly larger than the outside diameter of the standard section received therein; and set screw extending through and threadedly received in a radial opening in a wall portion of said collar for engaging a standard section extending through said bore.

5. The stand of claim 4 in which each collar has its cylindrical bore relieved on one side by an arcuate recess; said arcuate recess merging with said bore along a pair of apical, longitudinally-extending edges spaced apart a distance that is less than the outside diameter of the section received in said bore; said threaded opening for said set screw having an axis extending a plane parallel with and extending between said edges.

6. The stand of claim 5 in which said plane is equidistant between said edges.

7. The stand of claim 6 in which said recess is shaped as a portion of a cylinder having a diameter small than that of said bore.

8. The stand of claim 7 in which said edges are spaced apart an angular distance within the range of approximately 90 to 150 degrees along the surface of a cylindrical section received in said bore.

9. The stand of claim 1 in which said boom comprises a plurality of sections of substantially equal length; at least certain of said boom sections each having a threaded socket at one end and a threaded stem at the other end thereof receivable in the socket of another boom section for detachably joining said boom sections together.

10. The stand of claim 9 in which said boom sections have cylindrical outer surfaces.

11. The stand of claim 1 in which said cable retaining means comprises a transverse member secured to said standard at said upper end thereof; said member being provided with at least one arcuate upwardly-facing groove having a pair of spaced, upstanding side surfaces; said side surfaces having outer peripheral portions spaced apart a distance greater than the thickness of said cable and inner portions spaced closer than said cable thickness.

12. The stand of claim 11 in which said transverse member is generally cylindrical and said groove extends circumferentially; said transverse member being oriented with its axis perpendicular to said standard.

13. The stand of claim 11 in which said groove is offset laterally in relation to the vertical axis of said standard.

14. The stand of claim 1 in which said standard is provided at its lower end with a downwardly-facing threaded socket for receiving an upstanding attachment screw of a conventional tripod.

15. A support stand comprising a vertical standard having upper and lower ends; means at said lower end for stabilizing said standard on a support surface; a transversely-extending boom having opposite end portions provided with connecting means for attachment to articles to be supported by said boom and having an intermediate portion freely crossing said standard along one side thereof at a point below the standard's upper end; cable retaining means at said upper end of said standard; and a suspension cable having ends adjustably connected to said end portions of said boom and an intermediate portion extending over and adjustably retained by said retaining means; said boom comprising a plurality of sections of substantially equal length having cylindrical outer surfaces; at least certain of said boom sections each having a threaded socket at one end and a threaded stem at the other end thereof receivable in the socket of another boom section for detachably joining said boom sections together; and connecting means for adjustably connecting each end of said cable to said boom; each connecting means comprising a collar having a cylindrical bore slightly larger than the outside diameter of the boom section extending therethrough; and a set screw extending through and threadedly received in a radial opening in a wall portion of said collar for engaging a boom section extending through said bore.

16. The stand of claim 15 in which each collar has its cylindrical bore relieved on one side by an arcuate recess; said arcuate recess merging with said bore along pair of apical, longitudinally-extending edges spaced apart a distance that is less than the outside diameter of the section received in said bore; said threaded opening for said set screw having an axis extending along a plane parallel with and extending between said edges.

17. The stand of claim 16 in which said plane is equidistant between said edges.

18. The stand of claim 17 in which said recess is shaped as a portion of a cylinder having a diameter smaller than that of said bore.

19. The stand of claim 18 in which said edges are spaced apart an angular distance within the range of approximately 90 to 150 degrees along the surface of a cylindrical section received in said bore.

20. A support stand comprising a vertical standard having upper and lower ends; means at said lower end for stabilizing said standard on a support surface; a transversely-extending boom having opposite end portions provided with connecting means for attachment to articles to be supported by said boom and having an intermediate portion freely crossing said standard along one side thereof at a point below the standard's upper end; cable retaining means at said upper end of said standard; and a suspension cable having ends adjustably connected to said end portions of said boom and an intermediate portion extending over and adjustably retained by said retaining means; said cable retaining means comprising a transverse member secured to said standard at said upper end thereof; said member being provided with at least one arcuate upwardly-facing groove having a pair of spaced, upstanding side surfaces; said side surfaces having outer peripheral portions spaced apart a distance greater than the thickness of said cable and inner portions spaced closer than said cable thickness; said groove being offset laterally in relation to the vertical axis of said standard; said offset being approximately equal to the outside radius of said boom added to the outside radius of that section of said standard engaged by said boom.

21. The stand of claims 13 or 20 in which said offset is diametrically opposite from a point of contact between said boom and said standard, whereby, said cable extends in a plane that angles slightly from the vertical and crosses the axis of said standard.

22. A support stand comprising a vertical standard having upper and lower ends; means at said lower end for stabilizing said standard on a support surface; a transversely-extending boom having opposite end portions provided with connecting means for attachment to articles to be supported by said boom and having an intermediate portion freely crossing said standard along one side thereof at a point below the standard's upper end; cable retaining means at said upper end of said standard; and a suspension cable having ends adjustably connected to said end portions of said boom and an intermediate portion extending over and adjustably retained by said retaining means; said cable retaining means comprising a transverse member secured to said standard at said upper end thereof; said member being provided with a plurality of arcuate upwardly-facing grooves each having a pair of spaced, upstanding side surfaces; said side surfaces of each groove having outer peripheral portions spaced apart a distance greater than the thickness of said cable and inner portions spaced closer than said cable thickness; said grooves being at different distances from the axis of said standard.

23. The stand of claim 22 in which at least two of said grooves are located on opposite sides of said axis of said standard.

24. A collar for releasably engaging a cylindrical member of predetermined diameter; said collar having a wall defining a generally cylindrical bore; a cylindrical member received in said bore; said bore being of a diameter sufficiently large for loosely receiving said cylindrical member; an arcuate recess along one side of said bore merging with said bore along a pair of apical and longitudinally-extending edges spaced apart a distance less than said diameter of said cylindrical member; a threaded opening through said wall opposite from said recess; said opening lying along a plane extending between said edges; and a set screw threadedly received in said opening for engaging said cylindrical member extending through said bore and for urging the same into forceful engagement with said edges; said recess having an arcuate surface defining a portion of a cylinder having a diameter smaller than the outside diameter of said cylindrical member by an incremental distance substantially equal to the difference in diameter between said cylindrical member and said bore.

25. The collar of claim 24 in which said plane is equidistant between said edges.

26. The collar of claim 25 in which said edges are spaced apart an angular distance of approximately 90 to 150 degrees.

27. A method of making a collar for receiving, and securely and releasably engaging, a cylindrical member of predetermined outside diameter, comprising the steps of forming a collar with a cylindrical primary bore slightly larger than the outside diameter of said cylindrical member, then relieving one side of said bore along the full length thereof with a rotary cutter to form an arcuated recess bordered by a pair of parallel contact edges spaced apart an angular distance approximating one-third of the circumference of said bore, forming a radially-extending threaded opening in said collar opposite from said recess and spaced substantially equally from opposite ends of said collar, and fitting a set screw into said threaded opening; said recess having an arcuate surface defining a portion of a cylinder having a diameter smaller than the outside diameter of said member by an incremental distance substantially equal to the difference in diameter between said member and said primary bore.

28. The method of claim 27 in which said rotary cutter is rotated about an axis parallel with and displaced laterally from the axis of said primary bore.

29. The method of claim 28 in which the displacement of said axis of said cutter from said axis of said primary bore is about two times said incremental distance.

* * * * *